F. H. RICHARDS.
FASTENING DEVICE.
APPLICATION FILED DEC. 29, 1900.
954,763.
Patented Apr. 12, 1910.
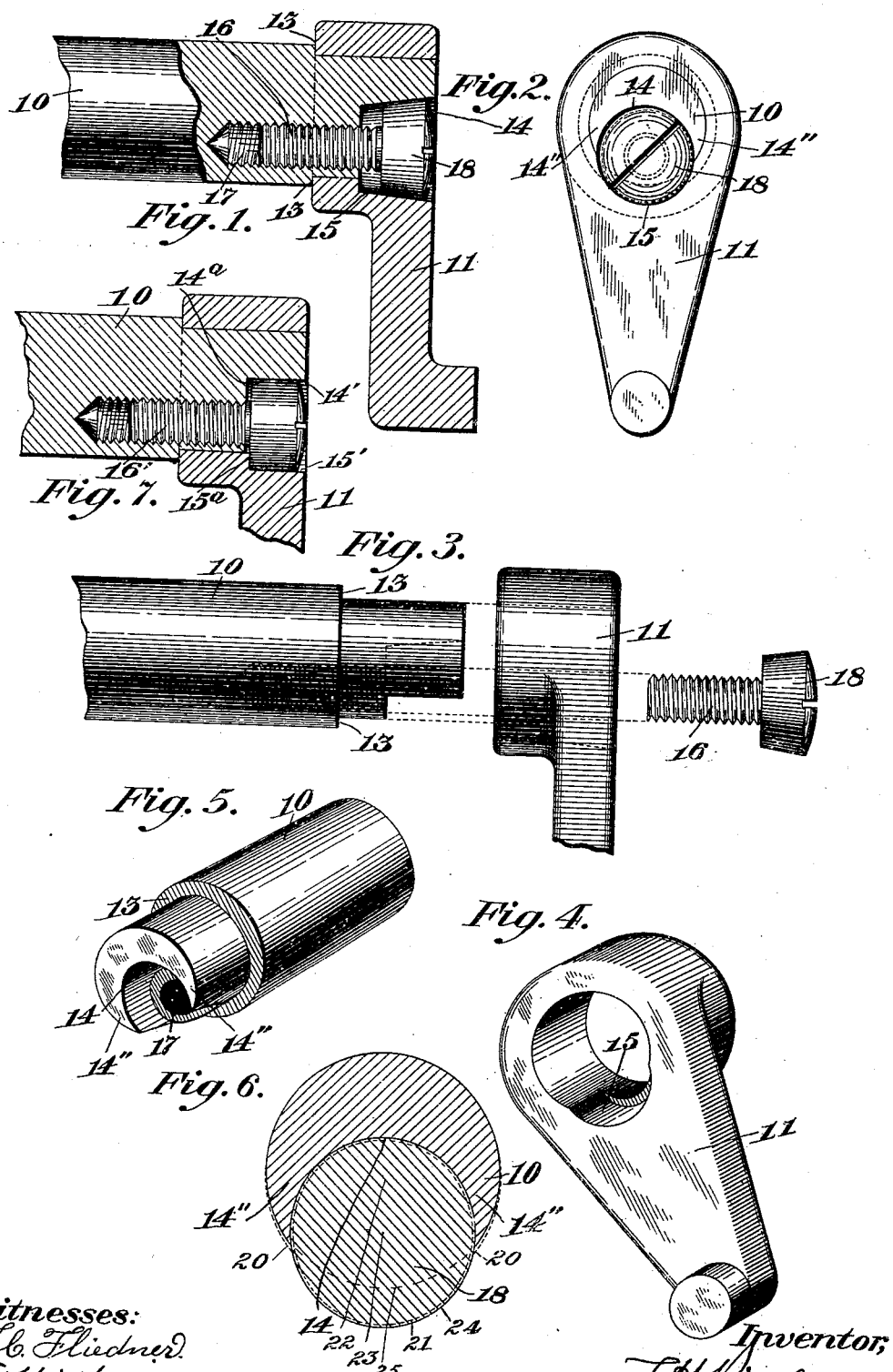

UNITED STATES PATENT OFFICE.

FRANCIS H. RICHARDS, OF HARTFORD, CONNECTICUT.

FASTENING DEVICE.

954,763.

Specification of Letters Patent.   Patented Apr. 12, 1910.

Application filed December 29, 1900.   Serial No. 41,522.

*To all whom it may concern:*

Be it known that I, FRANCIS H. RICHARDS, a citizen of the United States, residing at Hartford, in the county of Hartford and State of Connecticut, have invented certain new and useful Improvements in Fastening Devices, of which the following is a specification.

This invention relates to the improvements in fastening devices, and relates more particularly to those adapted to fasten crank-arms, gears and like elements upon the ends of shafts.

In the accompanying drawing, Figure 1 is a central, longitudinal section through a shaft and a crank-arm fastened together by one form of my improved device. Fig. 2 is an end elevation thereof looking from the right in Fig. 1. Fig. 3 is a side elevation with the parts separated. Fig. 4 is a perspective view of the crank-arm. Fig. 5 is a similar view of the shaft. Fig. 6 is a diagrammatic view showing the movement of certain portions of the device; and Fig. 7 is a central, vertical section of another form of the invention.

Similar characters designate like parts in the different figures of the drawing.

In the embodiment of my invention illustrated in the first six figures of the drawing, 10 designates a shaft surrounding which is a hub 11 of an element which it is desired to fasten thereto—in this instance, a crank-arm. The shaft is preferably provided with a shoulder or projection 13 against which the inner end or face of the hub may abut. The abutment face afforded by the shoulder 13 faces toward the end of the shaft. In that portion of the shaft within the hub is a recess 14 opening through the end and side thereof, leaving the walls at each side of the recess at 14″, 14″ reduced in thickness, and one side of the opening in the hub is cut away at 15 to continue this recess when the hub is in place on the shaft. The common recess 14, 15 thus formed may be conical with its walls tapering inward, and through it extends a screw 16, having connection with the shaft by means of a threaded opening 17 from the inner wall of the recess 14, and provided with a similarly tapered head 18. Such threaded hole may be tapped into a portion of the shaft not subject to flexure from the fastening device. When the shaft and the element to be secured thereto are assembled with the recesses 14, 15 together, the screw is turned into its threaded opening until the tapered head contacts with the tapered walls of the recess. As the head bears upon the reduced portion of the walls of the recess in the shaft, it tends to expand and force them out against the inside of the hub, as is shown in dotted lines 20 in Fig. 6, the taper of the head 18 is illustrated by the dotted lines 21, which, together with the fact that the recess in which the screw head lies is in both the shaft and hub, as here shown substantially half in each, results in firmly locking the two elements together and secures them against turning relatively to one another. At the same time the draft of the inclined screw head against the inclined wall of the hub recess holds the latter against the shoulder and prevents longitudinal movement. The screw thus acts here as an expander for the walls of the shaft and to draw the associated part upon it.

In the form of the device illustrated in Fig. 6 it will be seen that the inner portion of the head 18 where it engages the face 14, at about the region of the leader line from such reference character, passes beyond the axial line 22 of the shaft, and that the portion 24 of the head which will seat in the recess 15 of the hub passes beyond the contour 25 of the shaft tenon at such region. It will thus be seen that the diameter of the head 18 exceeds by a considerable amount the radius of the portion of the shaft embraced by the hub of the crank. The axis of such head is illustrated by the reference character 23. This organization gives the elasticity to the portions 14″ of the shaft and permits the expansibility of the walls of the recess. This device has been used in practice by applicant upon shafts of less than 5/16 of an inch in diameter. The hub of the crank will be resilient owing to its lightness. The hub will flex under the expansibility of the shaft end and the crowding in of the locking member, and the whole structure will flex into a tense condition of rigidity. This will give an entirely different structure from one wherein a locking pin small relative to the diameter of the shaft and to the mass of metal within the crank eye is employed for holding two parts together. The inner face of the hub will be drawn against the abutment face of the shaft by the engagement of the head of the fastener screw with the face of the wall of the recess 15, which faces in a direction opposite the said inner or abutment engaging face of the hub. The walls of recess 14 will afford a reaction abutment for the screw head for holding it against the abutment face constituted by the walls of the recess 15 and will enable it to hold the face of the hub against the abutment face upon the shaft.

In the form of the device shown in Fig. 7, a screw 16' is shown provided with a cylindrical instead of a tapered head, fitting a corresponding recess 14', 15'. The inner wall 15ª of the portion 15' of the recess lies in the plane outside of an inner wall 14ª of the portion 14'. The underside of the screw-head therefore contacts with this inner wall of the hub recess and holds it back against the shoulder on the shaft, while the fit of the screw-head in the recess lying in both shaft and hub locks them against turning relatively to each other.

It will be seen that this device furnishes a simple and easily made, yet secure, means for fastening small parts of machinery together, which may be readily detached and, when again fastened together, will assume the same relative position as before. These features render it of particular value in connection with machines of precision.

Having thus described my invention, I claim—

1. The combination with an outer element provided with a recess and a one piece inner element provided with a mating recess extending from one side past its axis, both of which recesses when the elements are combined forming a recess having an expansible wall, of a screw threaded into said inner element and having a tapered head within the said recess.

2. The combination with a shaft provided with a recess of circular formation entering one of its sides and extending beyond the axis of said shaft, a hub having an eye for surrounding said shaft and having a recess mating with the recess in the shaft and constituting a single recess of circular outline, and a locking member seated within said complete recess and adapted to expand the walls of the same and having securement to one of said members only.

3. The combination with a shaft member and a hub member, the shaft member being provided with a recess extending into its side at its end, an abutment face facing such end and a tapped hole extending into the shaft from the bottom of the recess, the walls of the recess comprising a reaction face, the hub having a face for engaging such abutment face and a recess for mating with the recess in the shaft and an abutment face facing in a direction opposite the said abutment engaging face; of a locking member having screw threaded connection with said tapped hole and seated in said recesses and having a face for engaging the abutting face in the recess in the hub and the reaction face in the recess in the shaft and forcing the abutment face on the shaft and the abutment engaging face on the hub into engagement.

4. The combination with a member provided with a flexible portion and a portion adjacent thereto relatively inflexible, said relatively inflexible portion being provided with a tapped hole, a member surrounding said flexible portion, a recess being provided between said flexible portion and the opening of said member surrounding it in line with said tapped hole, and a fastening member having a screw threaded portion for entering said tapped hole, and a locking portion for seating in said recess upon being screwed into said hole for flexing the parts together into a tense condition of rigidity.

FRANCIS H. RICHARDS.

Witnesses:
 FRED. J. DOLE,
 C. E. VOSS.